(12) United States Patent
Stettner et al.

(10) Patent No.: US 6,440,376 B1
(45) Date of Patent: Aug. 27, 2002

(54) METHOD FOR DISSOLVING NOBLE METALS OUT OF SEGREGATED ORES CONTAINING NOBLE METALS

(75) Inventors: Martin Stettner, Altenstadt (DE); Matthias Grehl, Frankfurt (DE); Horst Meyer, Altenstadt (DE)

(73) Assignee: W. C. Heraeus GmbH & Co. KG., Hanau (DE)

( * ) Notice: Subject to any disclaimer, the term of this patent is extended or adjusted under 35 U.S.C. 154(b) by 0 days.

(21) Appl. No.: 09/595,185

(22) Filed: Jun. 16, 2000

(30) Foreign Application Priority Data

Jun. 18, 1999 (DE) .......................................... 199 28 029

(51) Int. Cl.$^7$ .............................................. C22B 11/00
(52) U.S. Cl. .............................. 423/22; 423/27; 423/38; 423/39; 423/46
(58) Field of Search .............................. 423/22, 27, 38, 423/46, 39

(56) References Cited

U.S. PATENT DOCUMENTS 846,768 A * 3/1907 Worsey et al. ................ 423/38
1,041,407 A * 10/1912 De Alzugaray

FOREIGN PATENT DOCUMENTS

GB    1 517 270    7/1978

OTHER PUBLICATIONS

Abstract of RU 2041965, Aug. 20, 1995.*
JP 0580194745 AA, published Nov. 12, 1983.
JP 0570169027 AA, published Oct. 18, 1982.
Database WPI, Section Ch, Week 199739, Derwent Publications Ltd., London, GB; An 1997–416628, XP002147121 & CN 1 114 361 A (Shenhua Inst Metal Materials Shaanxi), Jan. 3, 1996, Abstract.
Database WPI, Section Ch, Week 199744, Derwent Publications Ltd., London, GB; An 1997–471733, XP002147336 & CN 1 119 678 A (Shenhua Metal Material Inst Shaanxi), Apr. 3, 1996, Abstract.
Patent Abstracts of Japan, vol. 007, No. 100 (C–145) Jan. 18, 1983 & JP 57 169027 A (Toyota Jidosha Kogyo KK), Oct. 18, 1982.
Patent Abstracts of Japan, vol. 003, No. 072 (C–049), Jun. 21, 1979 & JP 54 046120 A (Osaka Gas Co Ltd), Apr. 11, 1979.
Database WPI, Section Ch, Week 199346, Derwent Publications Ltd., London, GB; An 1993–360330 XP002147337 & CN 1 067 925 A (Kunming Inst Noble Metals Chinese Non), Jan. 13, 1993, Abstract.

* cited by examiner

*Primary Examiner*—Steven Bos
(74) *Attorney, Agent, or Firm*—Norris McLaughlin & Marcus

(57) ABSTRACT

A method for dissolving noble metals out of segregated ores containing noble metals, comprising:

reducing noble metal oxides present to the individual metals in finely divided form;

oxidating the segregated ores and/or the noble metals with HCl and chlorate to yield a solution or suspension having a concentration of $H^+$ ions of at least 1 mol/l, a concentration of $Cl^-$ ions of at least 1 mol/l and a temperature of at least 50° C.

3 Claims, No Drawings

METHOD FOR DISSOLVING NOBLE METALS OUT OF SEGREGATED ORES CONTAINING NOBLE METALS

The invention relates to a method for dissolving noble metals out of segregated ores containing them.

In the state of the art a series of methods are known for dissolving noble metals out of segregated ores. Reference is made in this connection to the blowing of elemental chlorine into a strong hydrochloric acid solution, to dissolving with aqua regia, to electrolytic dissolution of segregated metallic materials and to fusion with sodium chloride/chlorine. A disadvantage of the above-named methods is, for one thing, the use of relatively expensive chlorine gas, the relatively time-consuming introduction of the chlorine gas into the solutions and suspensions, the great contamination of the atmosphere with NOx by the washers and the sometimes problematic work safety.

From what has been said above, the problem is at least partially to remedy the stated disadvantages by means of a novel process. The problem lies especially in the replacement of the chlorine gas with an easy to manage and less expensive source of chlorine, which furthermore can be brought considerably more quickly into the corresponding solutions and suspensions, as well as the substitution of aqua regia and the resultant great reduction of the contamination of the air with $NO_x$ by the washers.

This problem is solved according to the invention by a method comprising dissolving noble metals out of segregated ores containing noble metals by a process comprising:

in the presence of noble metal oxides, reduction to the individual metals in finely divided form;

oxidative treatment of the segregated ores and/or the noble metals with HCl and chlorate, the solution or suspension resulting having a concentration of $H^+$ ions of at least 1 mol/l, a concentration of $Cl^-$ ions of at least 1 mol/l and a temperature of at least 50° C.

In the method of the invention, in dealing with noble metal oxides, a reduction to the individual metals in finely divided form is performed. It is known that noble metal oxides cannot be dissolved directly with hydrochloric acid or oxidants. Therefore the oxides are first reduced with a reducing agent in an alkaline suspension to form the noble metal, which then dissolves in hydrochloric acid plus oxidants.

Fundamentally, the segregated ores and/or the noble metals are treated oxidatively with HCl and chlorate, and the developing solution or suspension has a concentration of $H^+$ ions of at least 1 mol/l, a $Cl^-$ ion concentration of at least 1 mol/l, and a temperature of at least 50° C.

One known method is to dissolve noble metals in hydrochloric acid/chlorine. In a hydrochloric acid solution, chlorine can be formed by the reaction of chlorate with hydrochloric acid which then oxidizes the noble metals. A $H^+$ ion concentration of 1 mol/1 and a minimum temperature of 50° C. are necessary, however, in order for the chlorate to react chemically.

Potassium chlorate or sodium chlorate can be used, for example, as chlorate sources.

It is an advantage if the temperature of the solution or suspension formed is no more than +95° C., since above +95° C. explosive $ClO_2$ (chlorine dioxide) can form.

It is furthermore advantageous if the solution or suspension has at least 3 mol/l of $H^+$ ions, since in this way the noble metals are dissolved rapidly and virtually completely.

It is advantageous, furthermore, if the oxidation is performed under potential control, since in this manner the end of the oxidation is relatively easy to know and thus a targeted control of the process is possible.

It is furthermore advantageous if, in the case of noble metal oxides, the reduction is performed by means of formic acid or hydrazine, since these reducing agents have proven effective in practice. The noble metal oxides are suspended in alkaline solution, especially caustic soda solution and treated with the reducing agent at elevated temperature. Formic acid is used when noble metal oxides are present together with noble metals, and hydrazine in the case of merely oxide materials.

If the reduction is performed by means of hydrazine, it is advantageous if the noble metals are washed free of hydrazine so as not to interfere stubbornly with the following oxidation.

The following specifications are especially advantageous since they have proven effective in practice:

The segregated material containing noble metals and/or the noble metals are suspended in 3 to 5 molar hydrochloric acid before the oxidative treatment with HCl and chlorate. The suspension or solution of the segregated material containing noble metals is heated to +70° C. to +80° C. The chlorate is added as an aqueous 4.5 to 5.0 molar chlorate solution.

The following examples serve to explain the invention.

1. Dissolving the ore concentrate 1.1 Input material

Concentrate suspension washed after hydrazine reaction

Hydrochloric acid, conc., techn.

Sodium chlorate solution, techn.5 mol/l 1.2 Performance of test, and comments

Apparatus used

The apparatus used consisted of a 2-liter reaction vessel, a stirring motor, glass stirrer, stick thermometer, mushroom heater hood and pH and redox single rod measuring chain (Pt//Ag/AgCl) With the aid of a waterjet pump, a gentle air stream was passed through the apparatus. At the end, it was aspirated through a washing bottle containing 100 ml of 10 N HCl.

HCl/Chlorate Extract 866.55 g of pre-reduced Ore concentrate suspension and 700 ml of concentrated hydrochloric acid was placed in the test reactor. Then the mixture was heated to a temperature of 75° C. The temperature was sustained and sodium chlorate solution was added slowly by means of a peristaltic pump. After the addition of 55 ml of sodium chlorate solution, within 35 minutes the redox potential rose from an initial level of 350 mV to 1020 mV vs. Pt//Ag/AgCl. At the same time, a decided development of chlorine gas was observed. Then stirring was continued for 30 minutes at 75° C. and the solution was let stand until it had cooled down to 40° C. Then the solution was suction filtered through a black band filter and the residue was washed portion-wise with fully desalted water (FDW) until the filtrate was clear. The filtrate and the wash water were combined (2570 ml) and sent for DCP analysis. The residue was dried in a vacuum drying oven for 8 hours at 100° C. (10.04 g) and a DCP analysis was ordered The content of the wash bottle was colorless and therefore not further analyzed.

The following results were obtained:

| | |
|---|---|
| Ru | 98.0% |
| Au | >97.8% |
| Pd | 99.7% |

-continued

| | |
|---|---|
| Pt | 99.8% |
| Ir | 95.8% |
| Rh | 90.0% |

The noble metals Ru, Au, Pd, and Pt were mobilized in a very good yield (98–99%), while no ruthenium was distilled out Iridium could be dissolved to 95.8%. Rhodium only to 90%. The rhodium was not completely activated in the comparable $HCl/Cl_2$ dissolving process. The silver was 97% in the insoluble residue, as expected.

2. Dissolving Pd ashes
2.1 Starting material
- Pd/Pt ashes (burnt carbon-supported catalyst, approx. 50–100 kg noble metal content)
- Formic acid, 85%, technical
- Concentrated hydrochloric acid, technical
- Tap water
- Sodium chlorate solution, 4.5 mol/l, technical
2.2 Formic acid reduction and chlorate recovery Approximately 1000 l of tap water was placed in the reaction tank and the stirrer was turned on. Then the Pd/Pt. washes were added to the tank and stirred in. After the addition of 20–80 l of concentrated caustic soda solution (the amount of caustic soda solution was the same as the amount of formic acid), the suspension was able to be heated to a temperature of 70° C. (+/−2° C.) with stirring.

The heat was then shut off. The suspension gave an alkaline reaction (pH=14) Over a period of 60 minutes, 5 to 80 liters of formic acid was added to the reactor, depending on the amount of palladium. During the addition of the formic acid, the contents of the tank foamed but slightly and always under control.

The pH of the solution was continuously monitored. When it dropped to pH=12, concentrated caustic soda solution was added in 10-liter portions. The temperature of the reaction mixture rose while the formic acid was added. After all of the formic acid had been added, stirring continued for half an hour. During the reduction, the color of the suspension had changed from brownish black to black.

Then about 1000 l of concentrated hydrochloric acid was added to the suspension. The first 300 l of hydrochloric acid had to be added very slowly (about 45 minutes) since the solution tended to foam. However, the foaming was controllable at all times by readjusting the rate of addition of the hydrochloric acid. The remaining 700 l of hydrochloric acid !could then be added more rapidly. After that a temperature of 70° C. (+/−2° C.) was established. After the temperature was reached, the suspension was no longer heated. The redox potential of the solution was measured and determined at 0 mV vs. Pt//Ag/AgCl. Then sodium chlorate solution was pumped with the ALMATEC pump from a supply tank into the reactor. The feed rate was adjusted so that the entire amount of the necessary chlorate solution had been added within two hours. The maximum feed rate should not exceed 40 l of chlorate solution per hour at the end of the reaction; at the start it could be fed more rapidly since the reaction mixture had absorbed the chlorate without giving off chlorine gas.

Throughout the period of chlorate addition the tank was under observation. The temperature of the suspension was continuously monitored. A decided temperature rise was observed.

Foaming combined with the evolution of chlorine gas indicated the end of the reaction. In this case the addition of chlorate was immediately stopped. After the addition of the sodium chlorate solution, the redox potential of the suspension was measured It had risen to a level of 980 mV vs. Pt//Ag/AgCl. After the end of the chlorate addition, the pump used was flushed out with water only at a low feed rate (about 40 1/h) until the residual sodium chlorate solution had been removed from the tubes.

After the chlorate feed was stopped, the suspension was held for another hour at 80–90° C. with stirring. The suspension was then stirred further until it had cooled to 60° C. (+/−5° C.). The suspension was let stand and siphoned off as far as possible.

The residue from the treatment was filtered through a filter press and washed as thoroughly as possible. The filtrate was added to the noble metal solution. The residue was dried, heated to incandescence and analyzed.

3. Dissolving of Pt/Pd-containing residues by an alkaline pressure-less process
3.1 Input material
- Residue after alkaline pressure-less process
  Batch A) with about 3.5% Pd
  Batch B) with about 2.5% Pd (both computed from the analysis FIGS.)
- Hydrochloric acid, concentrated, technical
- LEVOXIN 15, 15% Hydrazine in water (Bayer AG), p = 1.03 g/cm³
- Formic acid, techn. 85%
- Sodium chlorate solution, techn. 5 mol/l
Residues containing Pt and Pt/Ir are processed similarly.
3.2 Performance of the test and remarks Apparatus used
The apparatus used consisted of a 2-liter reaction vessel, stirrer motor, glass stirrer, rod thermometer, mushroom heating hood and pH and redox single rod measuring chain (Pt//Ag/AgCl).
A) HCl/Chlorate Extraction, Hydrazine Reduction and 2nd HCl/Chlorate Extraction 750 ml of 6 N HCl was placed in the experimental reactor and a sample of 225 g of material (batch A) was stirred in in portions. Outgassing and foaming were observed. After all the material had been stirred in, the suspension was heated by the reaction heat to 75° C. The temperature was maintained and sodium chlorate solution was added slowly with a peristaltic pump. After 5 ml of sodium chlorate solution had been added, the redox potential had risen from an initial 357 mV to 1020 mV vs. Pt//Ag/AgCl. Addition was continued up to a total of 13 ml of sodium chlorate solution, while a definite outgassing of chlorine was observed. Then stirring was continued for another 30 minutes at 75° C. and the solution was let stand until it had cooled down to 40° C. Then it was suction filtered through a black band filter and the residue was washed in portions with 500 ml FDW. The filtrate and the wash water were combined (1090 ml) and subjected to the standard DCP analysis. The residue (117.77 g) was dried in a vacuum drying oven for 8 hours at 100° C. and a DCP analysis was ordered.

The evaluation of the analyses showed that only about 50% of the palladium had been dissolved. For this reason the residue, after the first HCl/chlorate extraction, was subjected to a hydrazine reaction.

An amount of 106.87 g of the residue was suspended with 750 ml of water, adjusted to a pH of 12 with concentrated caustic soda solution and heated with stirring to 70° C. Then a total of 12 ml of LEVOXIN 15, 15% Hydrazine in water (BayerAG) was added in portions of 2 ml. At first a definite foaming of the solution was observed, which diminished after 10 ml of LEVOXIN 15 had been added. The color of the suspension changed during the reduction from ochre to dark gray. The suspension was let stand until it had cooled to 40° C. and was suction filtered through a black band filter. Then the residue was washed with 500 ml of fully desalted water in portions and suctioned dry.

The filtrate and wash water were combined (1575 ml) and the dark-colored solution was subjected to standard DCP analysis.

The residue of the hydrazine reduction was completely transferred into the test reactor and 600 ml of 6 N HCl was added. Then the residue was extracted with 17 ml of sodium chlorate solution as described above. The residue (96.78 g, light gray) was filtered out, washed and dried and together with the filtrate (1075 ml incl. wash water) was subject to standard DCP analysis.

The starting composition was calculated with the aid of the analysis values of the first chlorate extraction, the mother liquor after hydrazine reaction, the second chlorate extraction and the content of the residue after the second chlorate extraction. It could be seen that, in the first dissolving step without prior reduction, only 47% of the calculated palladium content could be activated. After reduction with hydrazine, another 51% of the palladium could be dissolved. The mother liquor after the hydrazine reduction contained about 1% of the palladium; possibly a slight redissolving of the palladium occurred due to the slow filtration. The residue after the second dissolving process still contained 1% of the palladium, so that 99% was able to be activated. The chlorate extracts also contained Fe, Pb and Zn in appreciable amounts.

B) Formic Acid Reduction and HCl/Chlorate Extraction 240 ml of 0.1 N hydrochloric acid was placed in the test reactor and an amount of 100 g of the starting material was stirred into it in portions. Then it was heated to ebullition and formic acid was metered in with a peristaltic pump. After 13 ml had been fed in, within 15 minutes a color change from ochre to dark gray was observed. The heat was then turned off and stirring continued until the suspension had cooled to 80° C. 250 ml of concentrated hydrochloric aid was cautiously added, whereupon an outgassing combined with foaming was observed. The temperature of 80° C. was maintained after the addition of the aid and sodium chlorate solution was slowly added by means of a peristaltic pump. A total amount of 15 ml of sodium chlorate solution was added, and a definite outgassing of chlorine could be observed after 12 ml. Then stirring was continued for another 30 minutes at 80° C. and the 15 solution was let stand until it had cooled to 40° C.

Then it was suction filtered through a black band filter and the residue was washed with 500 ml of fully desalted water.

The filtrate and the wash water were combined (1140 ml) and delivered for standard DCP analysis. The residue (73.09 g, light gray) was dried in a vacuum drying oven for 2 hours at 100° C. and a palladium determination was made by dokimasia.

C) Formic Acid Reduction and HCl/Chlorate Extraction

The starting palladium content was computed from the sum of the noble metal content of the mother liquor and the residue.

| Pd | Starting material (Pd calculated) | Mother liquor after reduction and oxid. dissolution | Residue after oxid. dissolution |
|---|---|---|---|
|  | 100 g, 2.42% Pd | 1140 ml, 2.106 g/l Pd | 73.09 g, 0.03% Pd |
| Ab-solute | 2.424 g Pd | 2.402 g Pd | 0.022 g Pd |
| % | 100% | 99% | 1% |

The results of analysis show that it is possible to dissolve about 99% of the palladium content.

We claim:

1. A process for dissolving one or more noble metals out of a segregated ore containing said one or more noble metals, said process comprising the following steps:

a) reducing one or more noble metal oxides in said segregated ore to one or more noble metals in a finely divided form;

b) suspending or solubilizing the segregated ore and/or the one or more noble metals. in a finely divided form in 3 to 5 molar HCl to form a suspension or solution containing the segregated ore and/or the one or more noble metals in a finely divided form;

c) heating the suspension or solution to a temperature of about 70° C. to about 80° C.; and d) after said heating, oxidizing the suspension or solution by treating the suspension or solution under potential control with HCl and a 4.5 to 5.0 molar aqueous chlorate solution to yield a further suspension or solution, said further suspension or solution having a concentration of $H^+$ ions of at least 3 mol/l, a concentration of $Cl^-$ ions of at least 1 mol/l and a temperature ranging from 50° C. to 95° C.

2. The process according to claim 1, wherein said reducing comprises treatment with formic acid or hydrazine.

3. The process according to claim 2, wherein said reducing comprises treatment with hydrazine, and then washing one or more noble metals free of hydrazine.

* * * * *